L. E. CURTIS.
PROCESS OF MANUFACTURING EXPANDED METAL.
APPLICATION FILED SEPT. 1, 1915.
1,191,767.
Patented July 18, 1916.
3 SHEETS—SHEET 1.
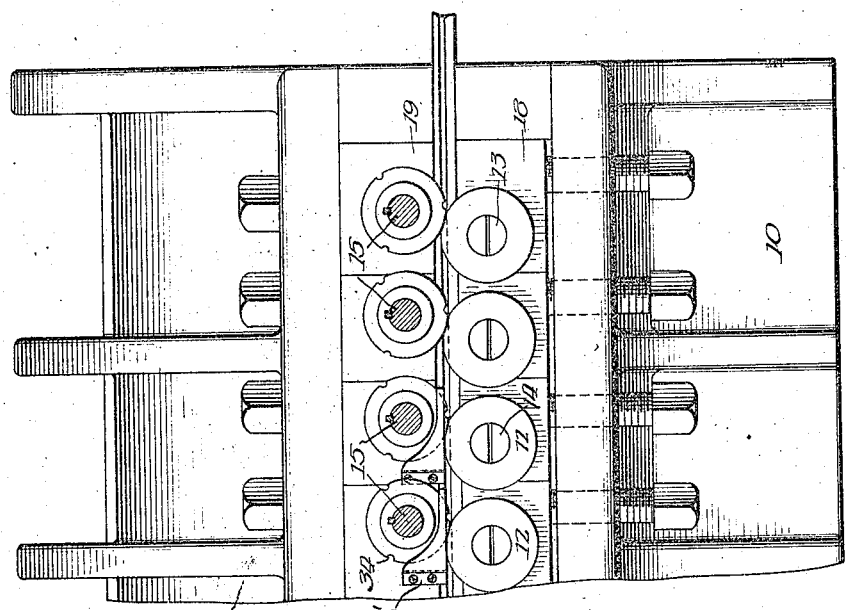
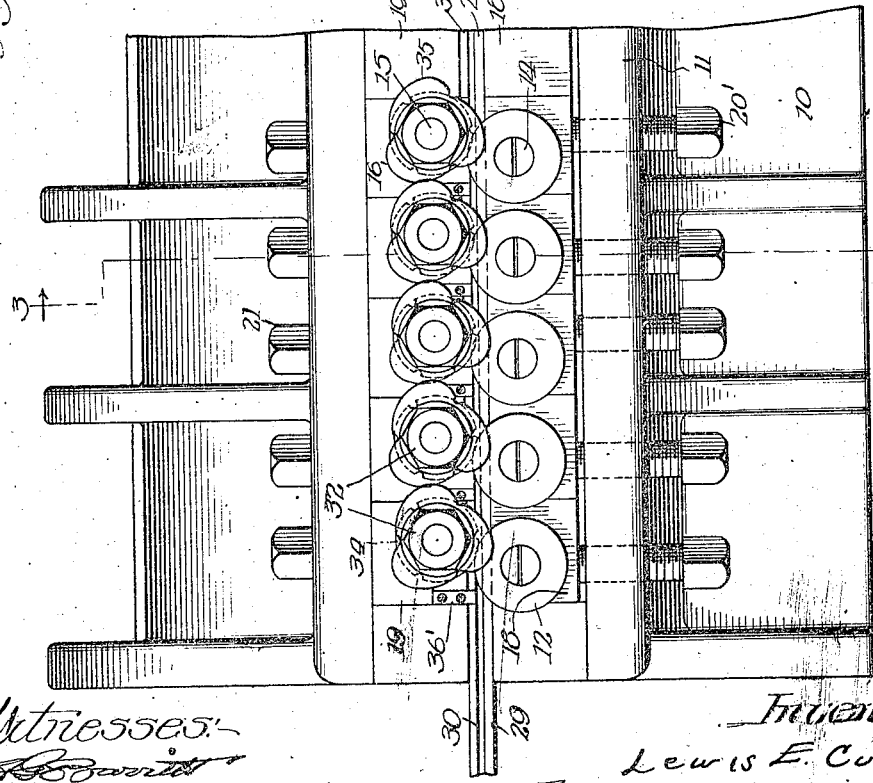
Witnesses:
Inventor:
Lewis E. Curtis
By George F. Haight, Atty

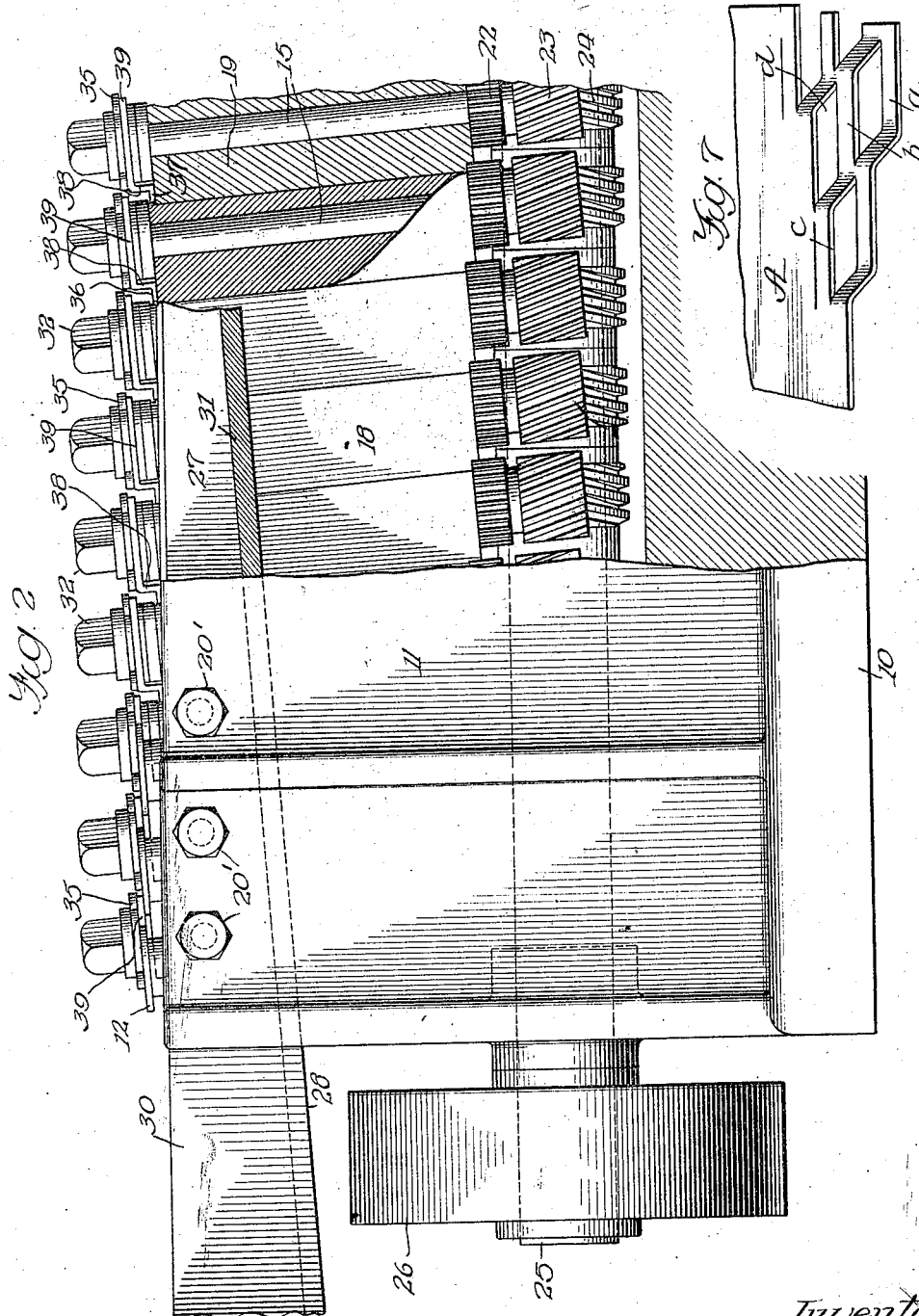

L. E. CURTIS.
PROCESS OF MANUFACTURING EXPANDED METAL.
APPLICATION FILED SEPT. 1, 1915.
1,191,767.
Patented July 18, 1916.
3 SHEETS—SHEET 3.
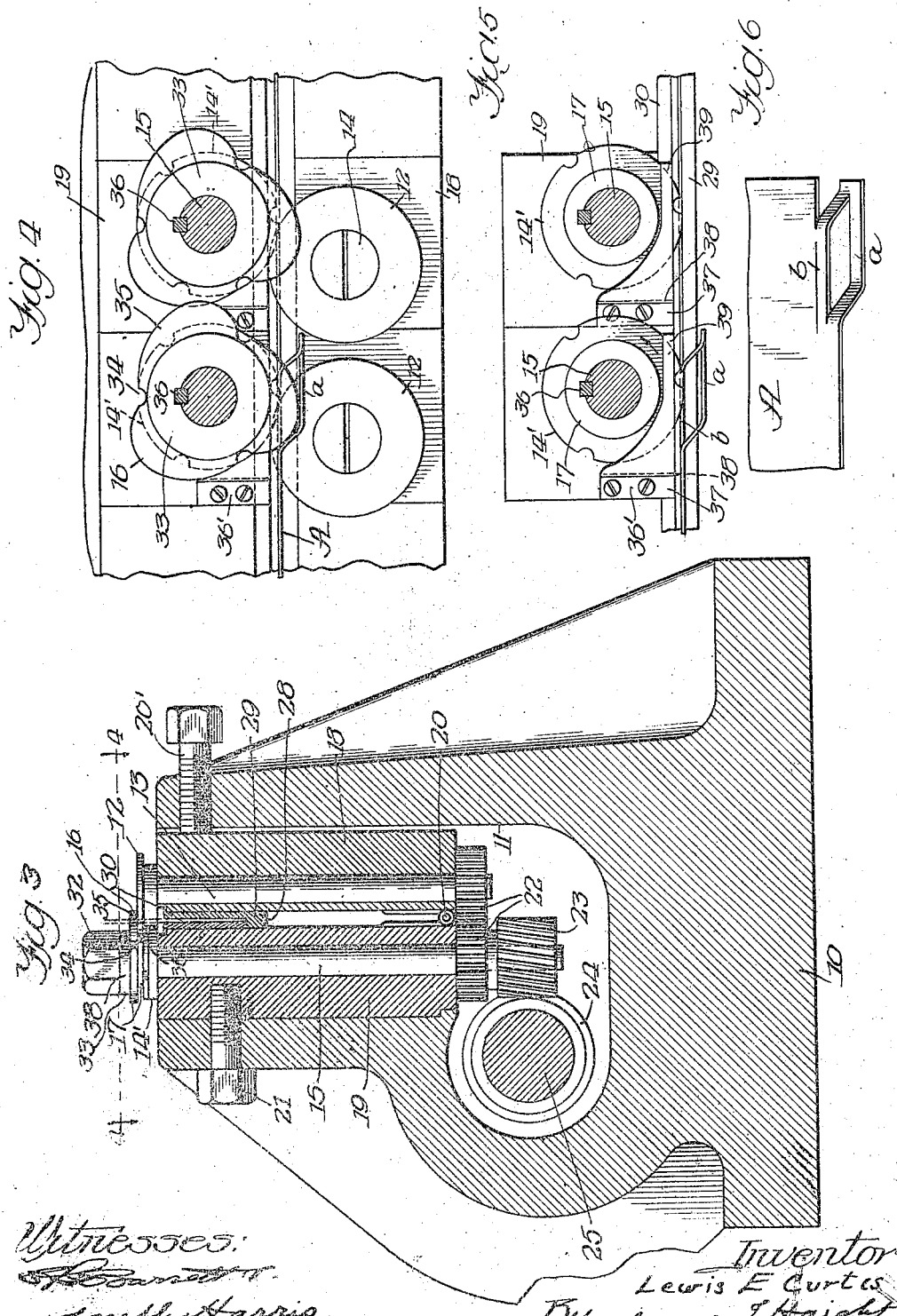

UNITED STATES PATENT OFFICE.

LEWIS E. CURTIS, OF KENILWORTH, ILLINOIS, ASSIGNOR TO AMES STEEL LATH COMPANY, OF ST. LOUIS, MISSOURI, A CORPORATION OF MISSOURI.

PROCESS OF MANUFACTURING EXPANDED METAL.

1,191,767.  Specification of Letters Patent.  Patented July 18, 1916.

Application filed September 1, 1915.  Serial No. 48,523.

*To all whom it may concern:*

Be it known that I, LEWIS E. CURTIS, a citizen of the United States, residing at Kenilworth, in the county of Cook and State of Illinois, have invented a certain new and useful Improvement in Processes of Manufacturing Expanded Metal, of which the following is a full, clear, concise, and exact description, reference being had to the accompanying drawings, forming a part of this specification.

This invention relates to improvements in process of manufacturing expanded metal.

One object of the invention is to provide a process of manufacturing expanded metal wherein alternate strands are cut and simultaneously opened, and the intermediate alternate strands are only cut, the opening up of the last named strands being accomplished indirectly by the opening up of the first mentioned alternate strands.

Another object of the invention is to provide a process of manufacturing expanded metal wherein the strands are cut by diagonally arranged series of stepped cuts, only separated strands being opened simultaneously with the cutting or slitting thereof.

The invention furthermore consists in improvements in the steps and novel combination of the steps of the process herein described and claimed.

In the drawing forming a part of this specification, I have illustrated one type of machine adapted to carry out my improved process and in said drawing, Figure 1, is a portion from top plan and part horizontal sectional view of the machine. Fig. 2 is a part side elevation, part central longitudinal section of the structure shown in Fig. 1, parts being broken away at the right hand end of the machine in order to more clearly illustrate the invention. Fig. 3 is a transverse sectional view of the machine and taken substantially on the line 3—3 of Fig. 1. Fig. 4 is a horizontal sectional view, upon an enlarged scale, of two of the sets of cutting and expanding means, the section being taken substantially on the line 4—4 of Fig. 3. Fig. 5 is another sectional view similar to Fig. 4 but showing the parts with the expanding disks removed. Fig. 6 is an enlarged view showing a portion of the sheet after the same has passed the first set of cutters and expanders, and Fig. 7 is a view similar to Fig. 6 but showing the sheet after the same has passed the second set of cutters and expanders.

In said drawing, the machine is shown as comprising a heavy base casting 10 through which extends longitudinally thereof, a recess 11 substantially L-shape in cross section. Mounted in said recess 11, and arranged longitudinally of the machine, is a plurality of sets of cutting and expanding elements. Each of these elements, as shown, consists of a plain cutting disk 12 mounted on an arbor 13 by means of a screw 14; a notched cutting disk 14' which coöperates with the lower edge of the disk 12, said notched disk 14' being secured to the arbor 15; and a second combined cutting and expanding disk 16, the latter also being secured to the arbor 15 and coöperating with the upper edge of the disk 12, the cutting and expanding disk 16 being separated from the disk 14 by means of a washer disk 17. The arbors 13 and 15 are rotatably mounted in elongated bearing blocks 18 and 19 respectively, said blocks 18 and 19 being pivotally connected at their lower end as indicated at 20 whereby the same may be relatively adjusted by means of the adjusting screw 20'. The bearing block 19 is held in fixed position relatively to the base casting 10 by means of the set screw 21. The arbors 13 and 15, at their lower ends, are provided with meshing pinions 22—22, and the arbor 15 is extended downwardly and has secured thereto a worm gear 23 meshing with and driven by a worm 24 secured to the drive shaft 25 which extends longitudinally of the machine, said shaft 25 being driven from any suitable source of power as by means of the pulley 26.

From the preceding description, it will be seen that all the cutting and expanding disks are positively and uniformly driven from the shaft 25. Extending longitudinally of the machine and arranged to properly present the metal sheet to the cutters, is a guide-way 27 formed by means of a guide plate 28 shouldered at its lower edge as indicated at 29, and a second guide plate 30, the bottom of the guideway 27 being inclined upwardly from the entrance end of the machine as indicated at 31 in Fig. 2. The inclination of the bottom of the guide-way 27 is in the ratio of the width of the strands being cut to the distance between centers of bonds. As clearly appears from Fig. 2, the arbors 13 and 15 are inclined from the vertical and are arranged perpendicularly to the bottom of the guide-way 27. The disks 14 and 16 are held on their respective arbors 15 by means of nuts 32 and washers 33 interposed between each nut 32 and corresponding disk 16. Each of the disks 16 as shown is provided with a plurality of equally spaced notches 34 around the periphery thereof and between each pair of notches 34 is an expander 35 which is in the nature of a cam as most clearly appears from Fig. 4. The disks and washers on the arbors 15 are preferably keyed thereto as shown by the keys 36. Secured to the top of each bearing block 19 is a stripper 36', the latter having a lower horizontal arm 37, an upwardly extending vertical arm 38 and a horizontally projecting finger 39 (see Figs. 2 and 5), said finger 39 extending between the disks 14 and 16 and opposite the adjacent cutting disks 12.

The sheet (A) is fed into the machine at the left hand end thereof, as viewed in Figs. 1 and 2, and in passing the first pair of cutters and expanders, the sheet will be slit and expanded as indicated in Fig. 6, i. e. two strands (a) and (b) will be formed, which are united by bonds staggered in the usual manner and the first strands (a) will be opened or expanded in a plane substantially perpendicularly to the plane of the sheet (A) as indicated in Fig. 6. The strand (a) is opened up by the expanding finger 35 simultaneously with the cutting or slitting thereof whereas the adjacent strand (b) is not opened up at the time it is cut. As the sheet (A) passes on to the next set of cutters and expanders, two more strands (c) and (d) will be formed and the strand (c) will be opened up simultaneously with the cutting thereof by the cutting and expanding disk 16 which cuts it. As will be understood, the opening up of the strand (a) will, indirectly, cause the strand (b) to be opened up to the position indicated in Fig. 7 and, similarly, the opening up of the strand (c) will, indirectly, cause the strand (d) to be opened up, and so on across the full width of the sheet.

From the preceding description it will be seen that while a plurality of strands are cut by each set of cutters and expanders, only one of the strands is actually opened up or expanded by the expanding means. In other words, the expanders of the machine only act directly on separated strands to expand the sheet and not on all strands as has hitherto been customary.

Although I have herein described what I now consider the preferred method of carrying out my invention yet the same is merely descriptive and I do not wish to be confined to the exact process described except in so far as limited by the claims appended hereto.

I claim:

1. The herein described process of manufacturing expanded metal which includes, slitting a sheet to form bonded strands and directly opening up alternate series only of strands thus formed simultaneously with the slitting thereof, the alternate intermediate strands being opened up indirectly and subsequent to the slitting operation by which they are formed.

2. The herein described process of manufacturing expanded metal which includes, slitting a sheet into bonded strands and directly opening up only separated strands simultaneously with the slitting thereof, intermediate strands being opened up indirectly.

3. The herein described process of manufacturing expanded metal which includes, cutting and simultaneously opening one strand, cutting the adjacent strand, cutting and simultaneously opening the next strand, cutting the next strand, and so on for all the strands across the sheet, the cutting and simultaneous opening of one strand and the cutting of the adjacent strand being performed substantially in the same line transversely of the sheet.

4. The herein described process of manufacturing expanded metal which includes, simultaneously slitting the sheet with two adjacent strands having bonds therebetween, the slits and bonds being staggered, and opening up directly only one of the series of the strands thus formed simultaneously with the slitting thereof.

5. The herein described process of manufacturing expanded metal which includes, simultaneously slitting the sheet with a plurality of adjacent strands with the slits and bonds staggered, opening directly part only of said strands simultaneously with the slitting thereof, and repeating the foregoing series of operations across the entire width of the sheet, the strands not directly opened up being indirectly opened up.

6. The herein described process of manufacturing expanded metal which includes, slitting a sheet with successive diagonally arranged series of cuts in stepped pairs of cuts, and opening up alternate series of strands thus formed simultaneously with the cutting thereof.

7. The herein described process of manufacturing expanded metal which includes, cutting a sheet in strands and simultaneously opening alternate strands in a plane substantially perpendicular to the sheet, each of the intermediate alternate strands being simultaneously cut with the cutting of the adjacent strand on one side thereof and indirectly opened when the adjacent strand on the other side thereof is opened.

In witness that I claim the foregoing I have hereunto subscribed my name this 16th day of August, 1915.

LEWIS E. CURTIS.

Witness:
JOSEPH HARRIS.